J. S. MOHAN.
LEAK STOPPER.
APPLICATION FILED NOV. 11, 1919.
1,334,778.
Patented Mar. 23, 1920.
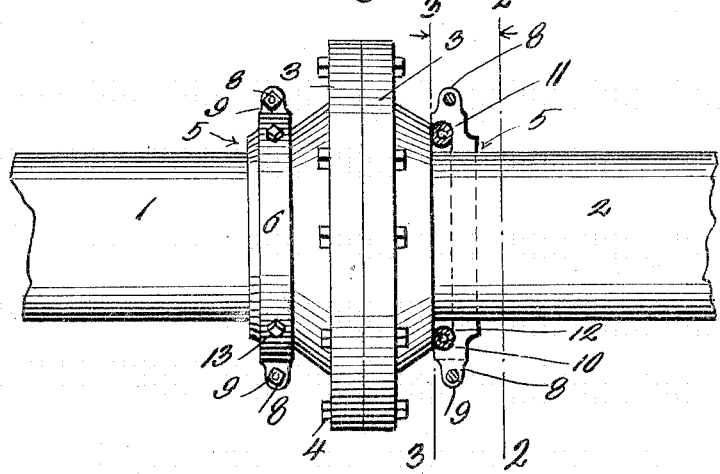
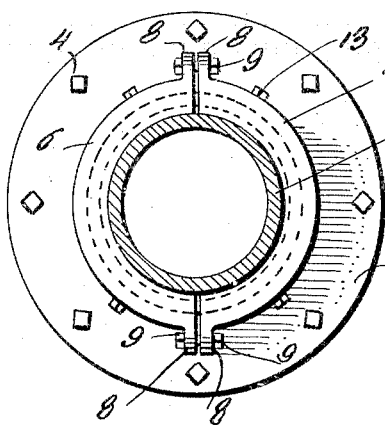
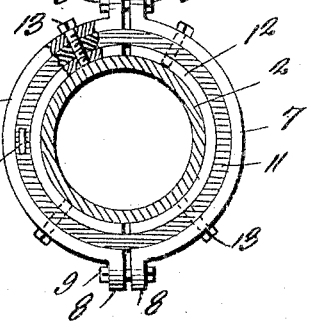
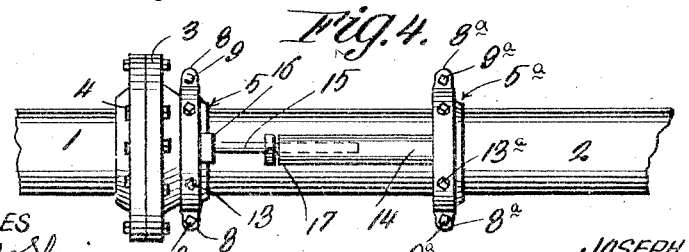
WITNESSES
Inventor
JOSEPH S. MOHAN

UNITED STATES PATENT OFFICE.

JOSEPH S. MOHAN, OF CLEVELAND, OHIO.

LEAK-STOPPER.

1,334,778.

Specification of Letters Patent.  Patented Mar. 23, 1920.

Application filed November 11, 1919. Serial No. 337,314.

*To all whom it may concern:*

Be it known that I, JOSEPH S. MOHAN, a citizen of the United States, residing at Cleveland, in the county of Cuyahoga and State of Ohio, have invented certain new and useful Improvements in Leak-Stoppers, of which the following is a specification.

This invention relates to leak stoppers for steam, water and other pipes.

The object of the invention is to provide a stopper of this character which can be manufactured at a very small cost, which can be installed by any one in a very short time and which will operate as an effective time and trouble saver, being applicable without interfering in any way with the operation of the pipe.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of two pipe sections connnected with this improved leak stopper shown applied, Fig. 2 is a transverse section taken on the line 2—2 of Fig. 1, Fig. 3 is a similar view taken on the line 3—3 of Fig. 1, and Fig. 4 is a side elevation showing the means employed for applying the leak stopper.

In the embodiment illustrated, two pipe sections 1 and 2 are shown, connected by the usual flanged fitting 3, the flanges of which are secured by bolts 4. These fittings are usually threaded on the ends of the pipe sections to be connected thereby and leakage frequently occurs at their connection with said sections.

The stopper 5 constituting this invention is composed of two semi-circular members 6 and 7 having radially projecting apertured lugs 8 at their opposed ends designed to be connected and clampingly engaged with the pipe sections by bolts 9 passing through said apertured lugs. Any desired number of these leak stoppers may be employed wherever the leakage occurs, two being shown in Fig. 1, one on each side of the fitting, but as they are both exactly alike, one only will be described in detail. Each of the members 6 and 7 is provided on its inner face with a seat 10 arranged to register with the other seat and form an annular pocket for the reception of a packing ring 11 composed of tubular packing as is shown clearly in Fig. 1. This tubular packing is supplied in boxes and each box is accompanied by about a dozen lead tips 11ª. These tips are about two inches long and three sixteenths inch in diameter and are designed for use in connecting the ends of the packing after it has been cut to the proper size. A spool of red tape, not shown, also accompanies each box of the packing and is designed to be wrapped around the cut ends of the packing to hold it assembled.

As shown the packing receiving seat 10 is spaced from the inner face of the members 6 and 7, a flange-like portion 12 being formed inside said seat. This seat 10 is designed to receive a tubular packing 11 which comes for this purpose and which is shown in Fig. 1 before being compressed, and the device is clampingly engaged with the pipe section to which it is to be applied after the packing has had its ends connected by a lead tip 11ª and these ends wrapped with red tape. Tap bolts 13 preferably extend radially through the members 6 and 7 from the periphery thereof inward and are adapted to engage the pipe sections to hold the stoppers in adjusted position.

To properly position the leak stopper 5, a pipe 14 is arranged between an abutment in the form of a clamp 5ª clamped on one of the pipe sections, as shown in Fig. 4, and in one end of this pipe is mounted a threaded shank 15 having a head 16 for engagement with the rear face of the leak stopper to be applied. A nut 17 is mounted on the shank 15 and when rotated forces said shank forward causing the head thereof to forcibly engage the stopper 5 and move it toward the fitting of the pipe to which said stopper is to be secured. This nut 17 may be turned by any suitable wrench and after the stopper 5 has been properly positioned, the clamping nuts 9 are tightened up to hold it in this position and the bolts 13 are moved inwardly to engage the pipe 2. After this operation is effected, the pipe 14 and the parts used for actuating it may be removed.

In installing one of these leak stoppers, the rough matter is first cleaned from the section and fitting to which the stopper is to be applied, the tubular packing 11 is cut to fit the seat 10, a lead tip 11ª such as usually used for this purpose is inserted in the ends of the packing and a piece of red tape is wrapped around the packing ends. This tape wrapped packing is placed within one or two inches of the leak to be closed and after this is done, the stopper 5 is placed on the pipe with the bolts 9 tightened sufficiently to permit the member 5 to move freely on the pipe. After this has been done, the clamp 5ª which may be in the form of a stopper shown in Fig. 4 is applied in the manner above set forth. After this clamp 5ª has been applied in the manner above set forth and the members 15 actuated to force the stopper 5 into operative position, the leak will be effectively closed and the stopper will last for a period of from six to twelve months. It is of course understood that the above explained operation can be accomplished without in any way interfering with the use of the pipe and such stopper may be applied at any point found desirable.

These leak stoppers 5 may be molded at a foundry from malleable iron but cast iron may be used, although it is not so desirable, owing to the danger of breakage.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A leak stopper of the class described comprising clamping elements, each having a packing receiving seat in one face, means for expanding and contracting said elements, packing carried by said seats, and leak closing means secured in place by said elements.

2. A leak stopper of the class described comprising clamping elements each having a packing receiving seat in one face, means for expanding and contracting said elements, packing carried by said seats, leak closing means secured in place by said elements, and means for forcibly moving said elements into engagement with the pipe fitting.

3. A leak stopper of the class described comprising pipe encircling sections having apertured ears extending laterally outward from their ends, seats formed in the inner faces of said sections and in peripheral alinement with each other, packing means carried by said seats, leak stopping means to be clampingly engaged by said sections, and means for forcing said sections against the pipe fitting.

4. A leak stopper of the class described comprising two semicircular pipe encircling sections having apertured lugs extending radially from the ends thereof to receive securing bolts, semicircular seats formed in the inner faces of said sections, a seat in one section alining with that in the other and adapted to receive a packing, clamping bolts carried by said lugs, lead leak stopping means to be secured by said clamping sections, and bolts extending radially inward from the peripheries of said sections.

5. A leak stopper comprising pipe clamping means equipped with a packing receiving seat, means for forcing said clamp forward comprising an abutment, a pipe arranged between said abutment and the stopper to be moved, a shank inserted in said pipe with the head to engage said stopper, and a nut having threaded engagement with said shank operable on the turning thereof to forcibly move the stopper into operative position.

In testimony whereof I affix my signature in presence of two witnesses.

JOSEPH S. MOHAN.

Witnesses:
E. W. JOYCE,
M. J. WALTHER.